W. A. WARREN.
Valve for Water-Pipes for Watering-Stock.

No. 226,812. Patented April 20, 1880.

WITNESSES:
A. Schehl.
C. Sedgwick.

INVENTOR:
W. A. Warren
BY Munn & Co
ATTORNEYS.

United States Patent Office.

WILLIAM A. WARREN, OF PRINCETON, ILLINOIS.

VALVE FOR WATER-PIPES FOR WATERING STOCK.

SPECIFICATION forming part of Letters Patent No. 226,812, dated April 20, 1880.

Application filed January 20, 1880.

*To all whom it may concern:*

Be it known that I, WILLIAM A. WARREN, of Princeton, in the county of Bureau and State of Illinois, have invented a new and useful Improvement in Valves for Water-Pipes Designed for Watering Stock, of which the following is a specification.

Figure 1:
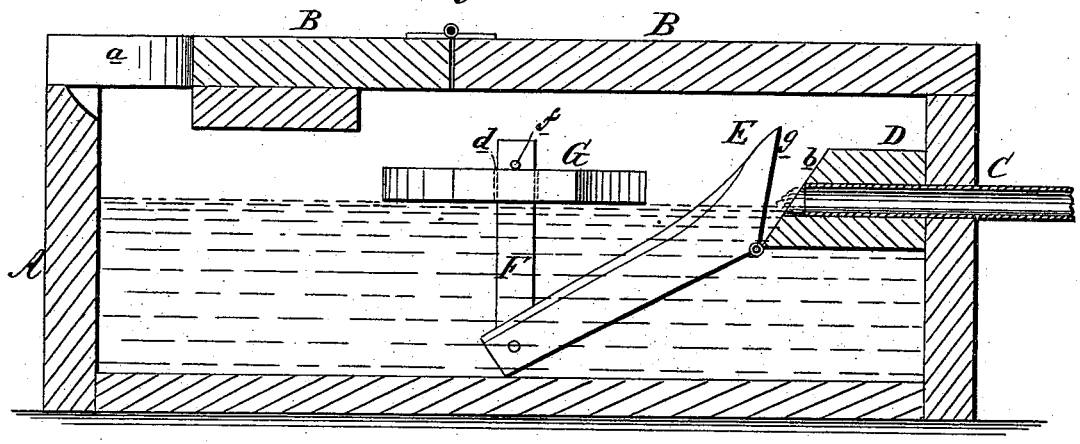
Figure 2:
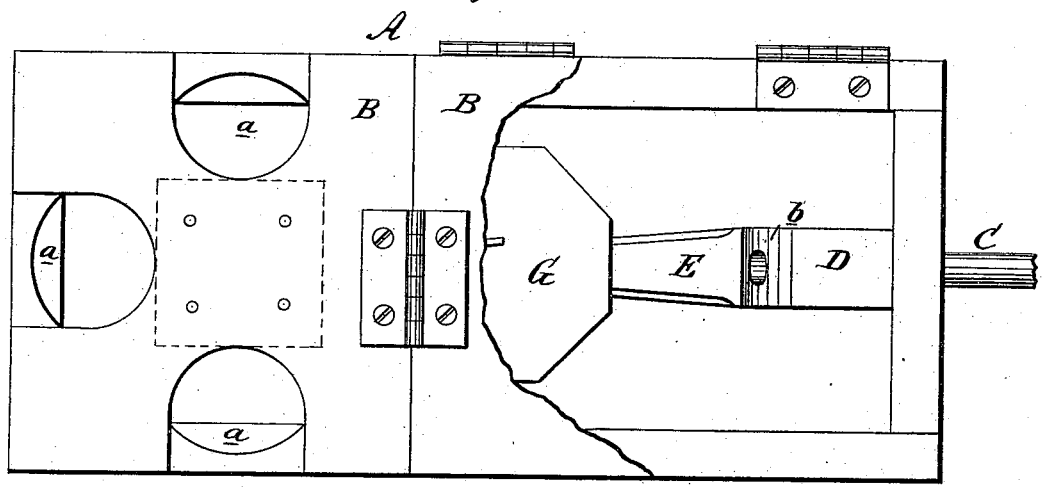

Figure 1 is a longitudinal sectional elevation of the device on line $x\ x$, Fig. 2. Fig. 2 is a plan of the device with a part of the cover broken away, the better to show the interior arrangements.

Similar letters of reference indicate corresponding parts.

The object of this invention is to supply a constant and self-regulating flow of water in troughs that are designed for watering stock.

The invention consists, essentially, of a long arm hinged to the end of the water-supply pipe and having its free end connected to a float that rises and falls with the rise or subsidence of the water in the containing-vessel, and thereby operates the said arm, so that it will admit or cut off the flow of water through the supply-pipe, the opposite faces or ends of the said supply-pipe and arm being cut obliquely for the better working of the valve or arm within a limited space.

In the drawings, A represents the trough; B, the cover, composed of two pieces hinged together and provided with openings $a\ a$, through which the cattle may reach the water.

C is the water-supply pipe, passing into one end of the trough A through a block, D, which is provided with a sloping face, $b$.

E is the valve or arm, which consists of an elongated block of wood, which arm E is hinged to the lower inner edge of the block D, and has a sloping end, $g$, corresponding with the sloping face of the said block D. To the lower and free end of this hinged arm E is attached a strap or chain, F, which connects the said arm with the float G by passing up through the aperture $d$ in the center of the said float G, and being secured there by the pin $f$. When the trough A is filled with water the float G remaining on the surface thereof will lift the lower end of the arm E, so as to close its sloping and hinged end $g$ tightly against the sloping face of the block D, and thus effectually check the flow of water through the supply-pipe C, and as water is taken from the trough the float G falls with the subsidence of the water and causes the sloping end of the arm E to fall from the sloping face of the block D, and thereby open the mouth of the supply-pipe C and admit the flow of water, as shown in Fig. 1.

The especial advantage of the arm or valve herein shown, in addition to its automatic operation, is that its free end, which is connected with the float G, rests in or near the bottom of the trough, so as to be ordinarily unaffected or unobstructed by ice or frost, even in the coldest weather, and the valve or arm, being elongated and having the float attached to its extreme end, possesses a sufficient leverage to cut off the flow of water, even if the water is flowing under strong pressure through the pipe C.

Having thus described my invention, I claim as new and desire to secure by Letters Patent—

1. The combination of the oblique-faced elongated arm E with the water-supply pipe C and oblique-faced end block, D, substantially as herein shown, whereby the flow of water through the pipe C may be regulated.

2. The combination, with the water-supply pipe C and oblique-faced block B, of the oblique-faced elongated arm E, float G, and connection F, substantially as herein shown, whereby the arm E is made to cut off the supply of water through the pipe C against a pressure of water, as set forth.

3. In the construction of a valve for regulating the flow of water, the oblique-faced elongated arm E, connection F, and float G, in combination, substantially as herein shown and described.

WM. ADAMES WARREN.

Witnesses:
J. W. HOTCHKISS,
JOHN W. FRENCH.